(12) United States Patent
Fujisaki et al.

(10) Patent No.: US 11,644,629 B2
(45) Date of Patent: May 9, 2023

(54) WAVEGUIDE CONNECTING STRUCTURE

(71) Applicant: Furuno Electric Co., Ltd., Nishinomiya (JP)

(72) Inventors: Kazuyoshi Fujisaki, Takarazuka (JP); Mitsuhiko Hataya, Takarazuka (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 0 days.

(21) Appl. No.: 17/670,526

(22) Filed: Feb. 14, 2022

(65) Prior Publication Data

US 2022/0260795 A1    Aug. 18, 2022

(30) Foreign Application Priority Data

Feb. 17, 2021    (JP) .............................. JP2021-023029

(51) Int. Cl.
*H04B 10/00* (2013.01)
*G02B 6/42* (2006.01)

(52) U.S. Cl.
CPC ......... *G02B 6/4284* (2013.01); *G02B 6/4243* (2013.01)

(58) Field of Classification Search
CPC combination set(s) only.
See application file for complete search history.

(56) References Cited

U.S. PATENT DOCUMENTS 2,476,621 A * 7/1949 Okress .................... H01P 1/042
285/330
2,548,404 A * 4/1951 Sobel ...................... H01P 1/042
403/336

(Continued)

FOREIGN PATENT DOCUMENTS

DE    820 455 C    11/1951
DE    883 460 C    7/1953

(Continued)

OTHER PUBLICATIONS

"Chapter 3 Special Electron Tube and Semiconductor, and Microwave Transmission Circuitry for Radar", Radar training instruction book (equipment maintenance), Japan Ship Electronics Association, Available Online at: https://nippon.zaidan.info/seikabutsu/2002/00403/contents/017.htm, Jun. 2002, 12 pages including English Translation.

(Continued)

*Primary Examiner* — Agustin Bello
(74) *Attorney, Agent, or Firm* — Xsensus LLP

(57) ABSTRACT

A waveguide connecting structure includes an inserting waveguide having an inserting conduit line and a flange extending outwardly in a conduit radial-direction, and a receiving waveguide having a receiving conduit line, a receiving structure into which the inserting waveguide is inserted, and stub grooves disposed on both sides of the receiving conduit line outwardly in the direction. The receiving structure has a receiving end face extending in the radial direction and opposing to a flange end face, and an annular receiving inner-circumferential surface disposed outward of the flange and extending in a conduit axial-direction. An electric length of each stub groove in the axial direction from an opening first end to a closing second end is ½ of a conduit wavelength of the stub groove.

20 Claims, 11 Drawing Sheets

(56) References Cited

U.S. PATENT DOCUMENTS

| | | | | |
|---|---|---|---|---|
| 2,561,130 A * | 7/1951 | McClellan | H01P 1/042 | 333/254 |
| 2,632,807 A * | 3/1953 | Kirkpatrick | H01P 1/064 | 333/256 |
| 3,221,279 A * | 11/1965 | Gross | H01P 1/042 | 333/254 |
| 3,374,450 A * | 3/1968 | Stewart | H01P 1/042 | 285/253 |
| 4,879,534 A * | 11/1989 | Spinner | H01P 1/06 | 333/257 |
| 5,245,301 A * | 9/1993 | Portrait | H01P 1/067 | 333/256 |
| 6,448,875 B1 * | 9/2002 | Sciarrino | H01P 3/14 | 333/248 |
| 7,592,887 B2 * | 9/2009 | Chao | H01P 1/042 | 333/254 |
| 7,884,688 B2 * | 2/2011 | Takemoto | H01P 1/042 | 333/254 |
| 9,444,149 B2 * | 9/2016 | Cha | H01Q 21/24 | |
| 10,186,741 B2 * | 1/2019 | Nealis | H04B 1/40 | |
| 10,290,913 B2 * | 5/2019 | Saito | H01P 3/127 | |
| 10,374,273 B2 * | 8/2019 | Kawasaki | H01P 1/04 | |
| 10,547,113 B2 * | 1/2020 | Roos | H01P 5/082 | |
| 11,309,622 B2 * | 4/2022 | Isambard | H01Q 1/12 | |
| 11,309,623 B2 * | 4/2022 | Saito | H01P 1/042 | |
| 11,527,806 B1 * | 12/2022 | Lewellen | H01P 5/02 | |
| 2003/0137465 A1 * | 7/2003 | Graczyk | H01P 1/042 | 385/39 |
| 2005/0285702 A1 * | 12/2005 | Graczyk | H01P 1/042 | 333/254 |
| 2008/0001686 A1 * | 1/2008 | Chao | H01P 1/042 | 333/254 |
| 2009/0058571 A1 * | 3/2009 | Takemoto | H01P 1/042 | 333/254 |
| 2011/0156844 A1 * | 6/2011 | Wakabayashi | H01P 3/12 | 333/254 |
| 2013/0342390 A1 * | 12/2013 | Cha | H01Q 19/195 | 342/352 |
| 2016/0218408 A1 * | 7/2016 | Saito | H01P 5/024 | |
| 2017/0271739 A1 * | 9/2017 | Nealis | H01P 3/12 | |
| 2019/0123411 A1 * | 4/2019 | Carlred | H01P 1/042 | |
| 2020/0303811 A1 * | 9/2020 | Saito | H01Q 1/288 | |
| 2020/0343622 A1 * | 10/2020 | Isambard | H01Q 1/1207 | |
| 2022/0260795 A1 * | 8/2022 | Fujisaki | H01P 1/042 | |

FOREIGN PATENT DOCUMENTS

| | | |
|---|---|---|
| GB | 618 446 A | 2/1949 |
| WO | 00/05778 A1 | 2/2000 |

OTHER PUBLICATIONS

Extended European Search Report dated Jul. 5, 2022 in European Application No. 22155854.7.

\* cited by examiner

WAVEGUIDE CONNECTING STRUCTURE

CROSS-REFERENCE TO RELATED APPLICATION

This application claims priority under 35 U.S.C. § 119 to Japanese Patent Application No. 2021-023029, which was filed on Feb. 17, 2021, the entire disclosure of which is hereby incorporated by reference.

TECHNICAL FIELD

The present disclosure relates a waveguide connecting structure which connects waveguides for transmitting high frequency.

BACKGROUND

As for a device using high frequency (for example, microwave) such as a weather radar, a waveguide is used as a transmission path of radio wave. In order to connect a second waveguide to a first waveguide, it is necessary to connect the first waveguide and the second waveguide without a gap. If there is a gap between the first waveguide and the second waveguide, the radio wave leaks from the gap. One example of the waveguide connecting structure is disclosed in FIG. 3.32 of "3.9.4 Waveguide," of "3.9 Microwave Transmission Circuitry" of "Chapter 3 Special Electron Tube and Semiconductor, and Microwave Transmission Circuitry for Radar," in Ship's Electric Equipment Technical Lecture [Radar] Apparatus Maintenance, for Online Education Course of The Ship's Electric Installation Contractors' Association of Japan, Support Measures of The Nippon Foundation, June 2002 (https://nippon.zaidan.info/seikabutsu/2002/00403/contents/017.htm). As illustrated in FIG. 3.32, the connection between the waveguides is commonly made by bringing a flange of the first waveguide into contact with a flange of the second waveguide without creating any gap, and fastening the flanges with fasteners such as bolts.

However, the waveguides are made of metal, and therefore, they have tolerances of machine parts. Even if trying to connect all the waveguides which constitute the transmission path without any gap, a gap is caused between the mutually-abutted waveguides at any of the waveguide connecting parts in the transmission path because of the tolerances. Although the tolerances may be reduced by fastening the flanges with the fasteners, the flanges are forced in the state where the stress is applied by using the fasteners. Further, if the tolerances are too large, it is difficult to eliminate the gap with the fasteners.

If waveguides with restrictions the stress must not be applied to the flanges are used, the fasteners for fastening the flanges cannot be used. As a result, the gap may be caused between the first waveguide having the restriction and the second waveguide connected to the first waveguide, and therefore, the radio wave may leak therefrom.

SUMMARY

The present disclosure is made in view of solving the above problems, and one purpose thereof is to provide a waveguide connecting structure which suppresses leak of a radio wave, even if waveguides are separated in a conduit axial direction because of a tolerance.

A waveguide connecting structure according to the present disclosure includes an inserting waveguide and a receiving waveguide. The inserting waveguide includes an inserting conduit line configured to transmit a radio frequency wave, and a flange extending outwardly in a conduit radial direction from an opening end of the inserting conduit line. The receiving waveguide includes a receiving conduit line abutted to the inserting conduit line, a receiving structure into which the inserting waveguide is inserted, and stub grooves disposed outwardly in the conduit radial direction of a first side and a second side of the receiving conduit line, outwardly in the conduit radial direction. The receiving structure has a receiving end face extending in the conduit radial direction and opposing to an end face of the flange, and an annular receiving inner circumferential surface extending in the conduit axial direction from the receiving end face toward the inserting waveguide side and disposed outwardly in the conduit radial direction of the flange. Each of the stub grooves has a first end opening to the receiving end face and a second end closing inside the receiving waveguide. An electric length of each of the stub groove in the conduit axial direction from the first end to the second end is ½ of a conduit wavelength of the stub groove.

Each stub groove may be disposed on the receiving conduit line side of a mid point of the receiving conduit line and the receiving inner circumferential surface in the conduit radial direction.

An electric length in the conduit radial direction from an inner circumferential surface of the inserting conduit line to the receiving inner circumferential surface may be an integer multiple of ½ of a free space wave length.

A plurality of stub grooves may be disposed outwardly in the conduit radial direction on each of the first side and second side of the receiving conduit line, outwardly in the conduit radial direction.

The receiving conduit line may be a rectangular waveguide path having a conduit cross section with long sides and short sides, and each of the stub grooves may be disposed along the long sides.

The receiving conduit line may be a circular waveguide path with a circular conduit cross section, and the stub grooves may be formed at line-symmetry positions with respect to a conduit axis of the receiving conduit line as a symmetry axis.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

First Embodiment

Hereinafter, a waveguide connecting structure of a first embodiment of the present disclosure is described with reference to the drawings.

Figure 1:
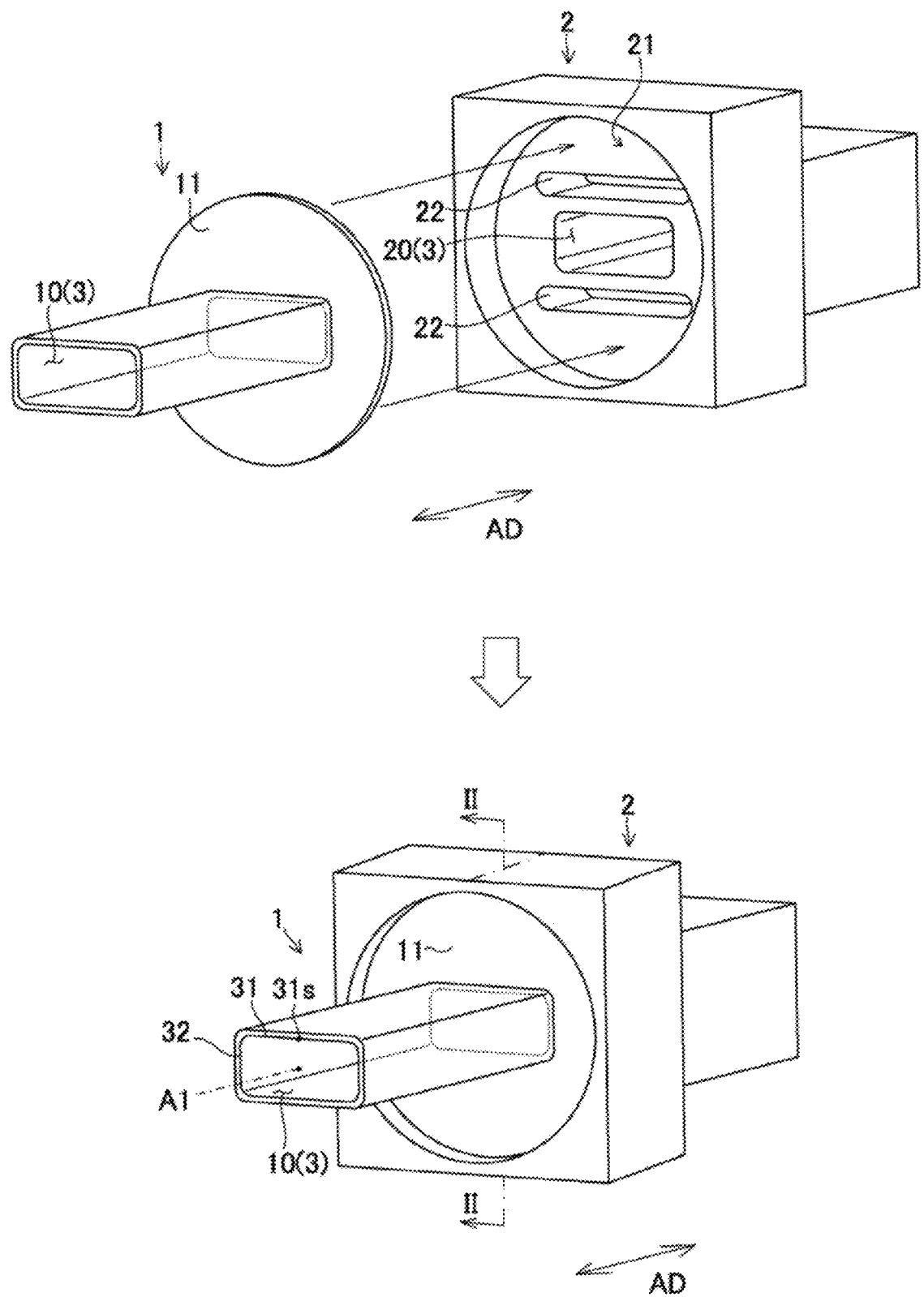
FIG. 1 is a perspective view illustrating a waveguide connecting structure before and after connection according to a first embodiment.
Figure 2:
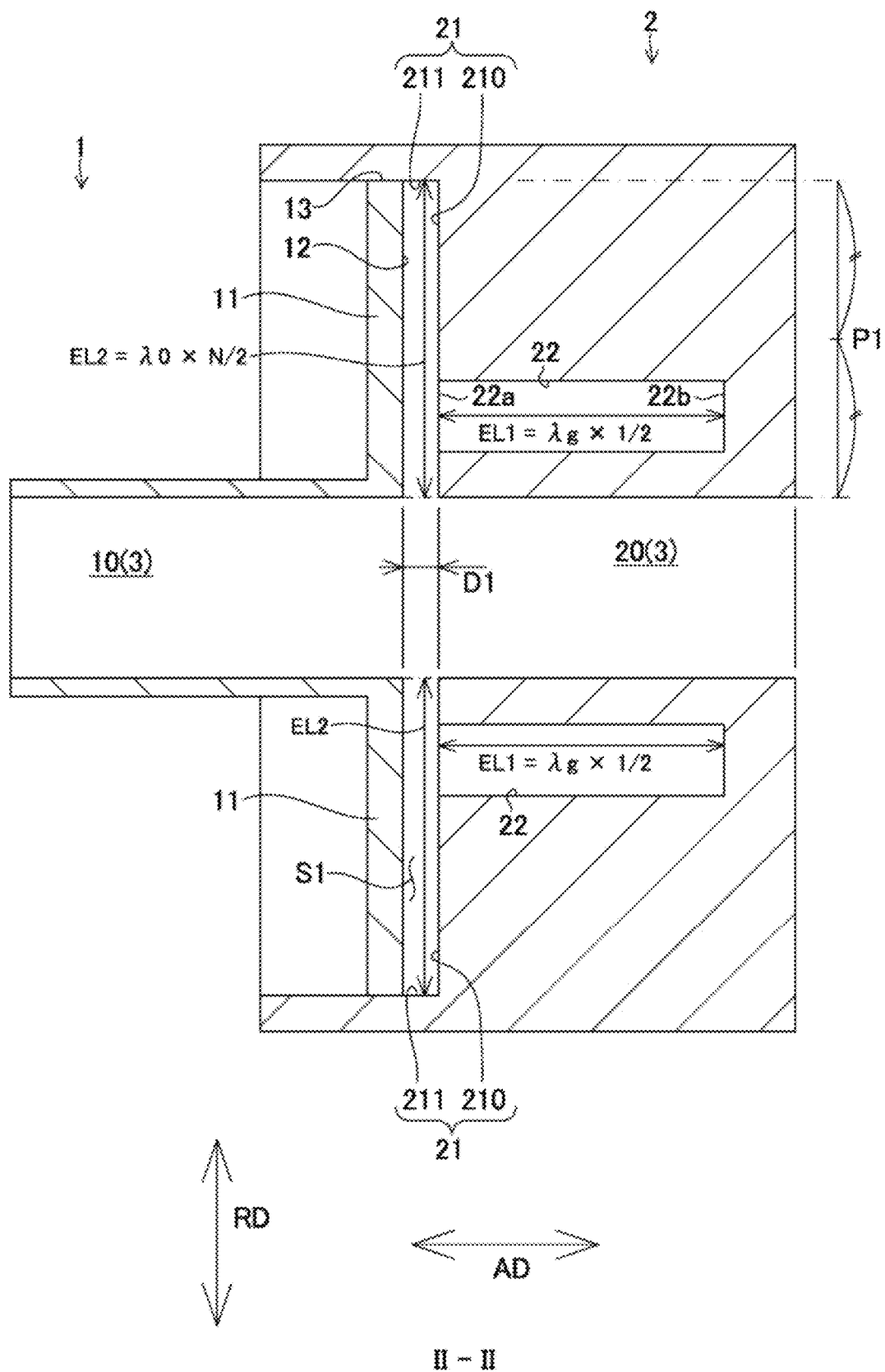
FIG. 2 is a cross-sectional view illustrating a part taken along a line II-II in FIGS. 1 and 3.
Figure 3:
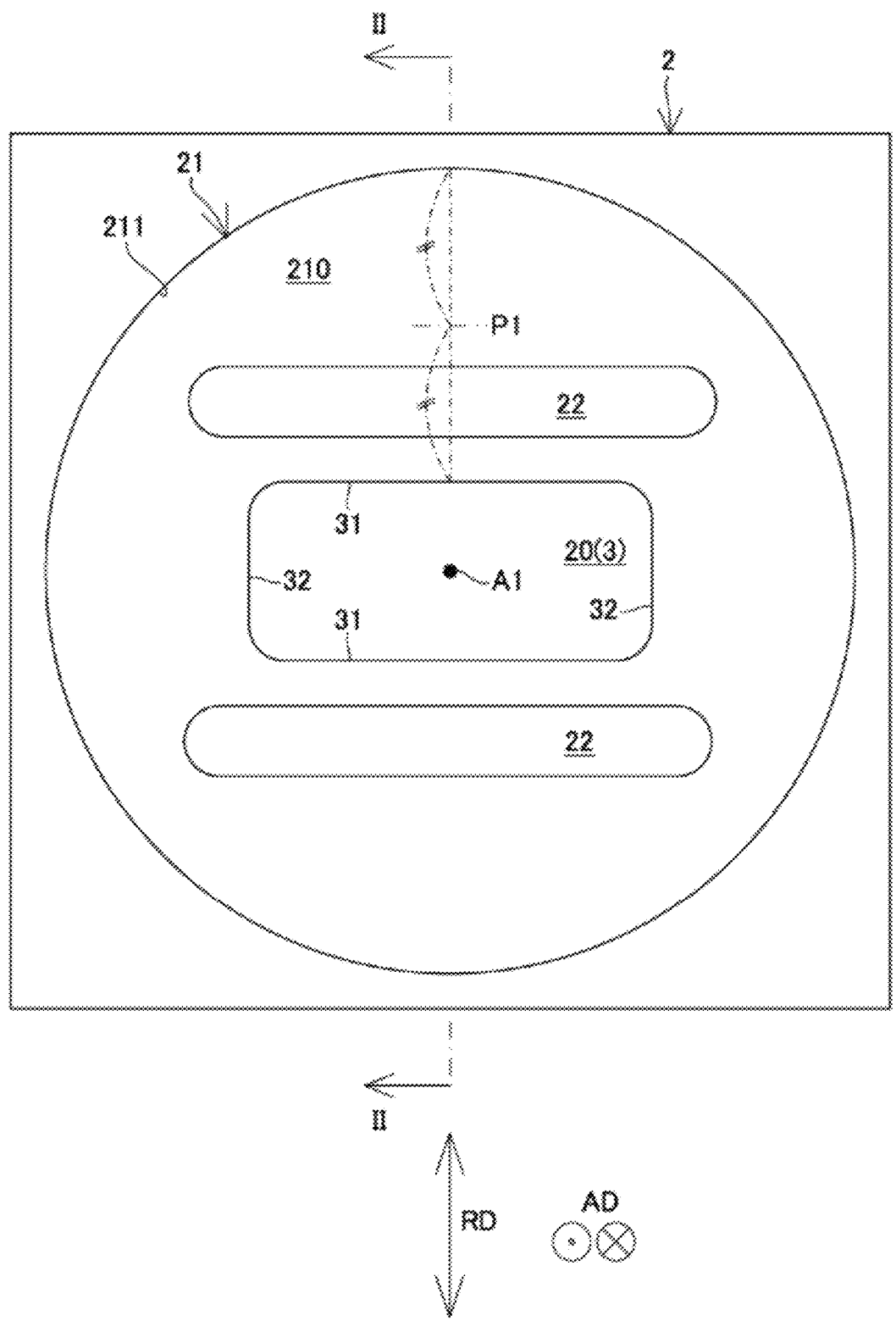
FIG. 3 is a front view illustrating a receiving waveguide when seen in a direction parallel to the conduit axis.

As illustrated in FIGS. 1 to 3, the waveguide connecting structure of the first embodiment may have an inserting waveguide 1 and a receiving waveguide 2. Where the inserting waveguide 1 is inserted in the receiving waveguide 2, a spatial relationship between the inserting waveguide 1 and the receiving waveguide 2 may be fixed. The inserting waveguide 1 may have an inserting conduit line 10 which transmits high frequency. The receiving waveguide 2 may have a receiving conduit line 20 which transmits high frequency. In the connected state, the receiving conduit line 20 and the inserting conduit line 10 may be abutted to each other. The connected state may be a state where the spatial relationship between the inserting waveguide 1 and the receiving waveguide 2 is fixed. Each of the inserting waveguide 1 and the receiving waveguide 2 may be a hollow conduit made of metal, and formed with a conductor. The inserting waveguide 1 and the receiving waveguide 2 may be electrically short-circuited, and may be grounded. The high frequency may be transmitted in a conduit axial direction AD from one side of the inserting waveguide 1 and the receiving waveguide 2 to the other side. The high frequency as used herein may refer to radio wave at 300 MHz or more, may be at 2 GHz or higher, or may be at 3 GHz or higher. Further, the high frequency may be radio wave at 50 GHz or lower as an upper limit, for example. Moreover, it may be radio wave at 40 GHz or lower. The high frequency may be microwave or millimeter wave. Although in this embodiment aluminum or stainless steel is used as the conductor, the material is not limited to these as long as it is the conductor.

Figure 4:
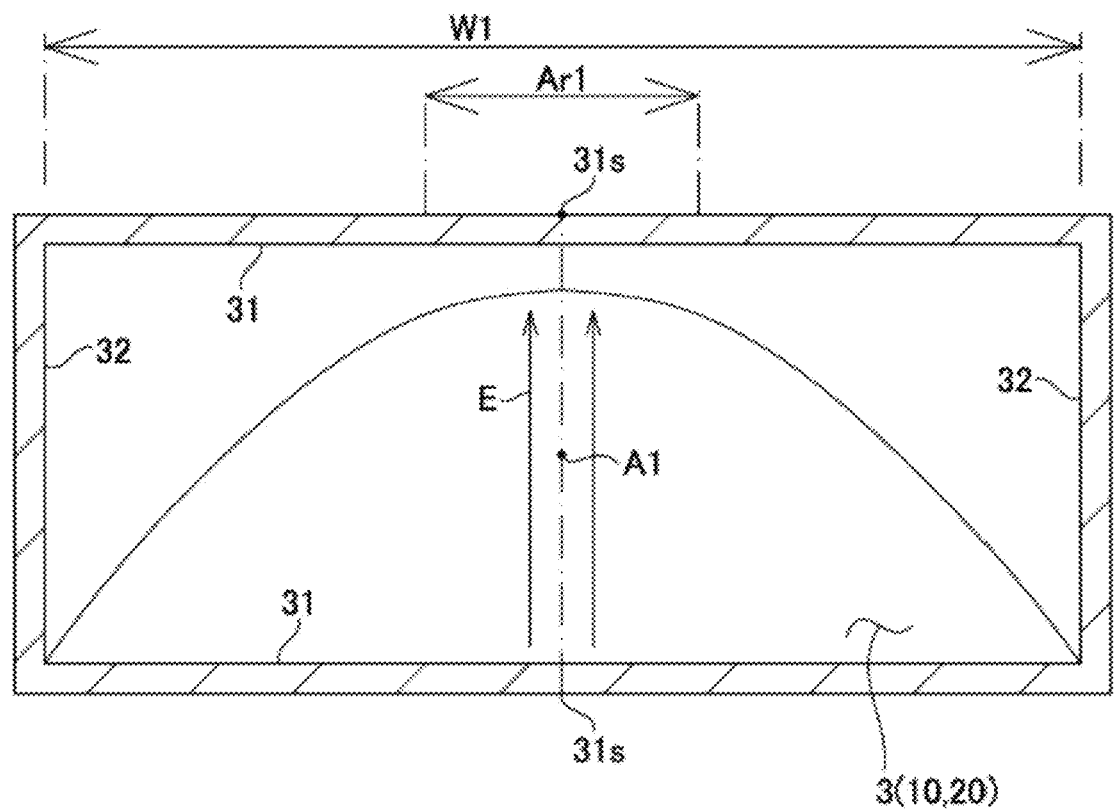
FIG. 4 is a cross-sectional view illustrating a rectangular waveguide path perpendicular to the conduit axis.

As illustrated in FIG. 4, the conduit line of the first embodiment (the inserting conduit line 10, the receiving conduit line 20) may be a rectangular waveguide path 3 having a conduit cross section with long sides 31 and short sides 32. The long sides 31 may be parallel to each other, and the short sides 32 may be parallel to each other. FIG. 2 is a cross-sectional view illustrating a part taken along a line II-II in FIG. 1. The II-II part cross section is a section which passes through centers 31s of the long sides 31 and the conduit axis A1. Inside the conduit line, an oscillating electric field may be caused by a traveling wave and a reflecting wave. FIG. 4 is a schematic cross-sectional view perpendicular to the conduit axis A1 which is a part in the conduit axial direction AD where the oscillating electric field E is strong. As illustrated in FIG. 4, the oscillating electric field E may have an antinode in the part connecting the centers 31s of the long sides 31, where it becomes the most dominant. On the other hand, the oscillating electric field E may not occur in the short sides 32. The high frequency may be transmitted inside the rectangular waveguide path 3 in a TE10 mode (Transverse Electric Mode) which is a basic mode of such a rectangular waveguide path 3. In the TE10 mode, the electric field does not occur in the direction parallel to the long sides 31, but occurs in the direction parallel to the short sides 32. Note that, without being limited to the basic mode (TE10 mode), modes other than the TE10 may be used.

As illustrated in FIGS. 1 to 2, the inserting waveguide 1 may have a flange 11 extending outwardly in a conduit radial direction RD from an opening end of an inserting conduit line 10. The flange 11 may be continuous in the conduit circumferential direction, and is formed in an annular shape. Although the flange 11 of the first embodiment has a disk shape centering on the conduit axis A1, but the shape may be changed variously, without being limited to the shape. An end face 12 of the flange 11 of the first embodiment may be parallel to the conduit radial direction RD. The end face 12 may be a surface of the flange 11 opposing to the receiving waveguide 2 (hereinafter, may simply be referred to as "the flange end face 12").

As illustrated in FIGS. 1 to 3, the receiving waveguide 2 may have a receiving structure 21 into which the inserting waveguide 1 can be inserted. The receiving structure 21 may have a receiving end face 210 which extends in the conduit radial direction RD and opposes to the flange end face 12, and an annular receiving inner circumferential surface 211 which extends in the conduit axial direction AD from the receiving end face 210 toward the inserting waveguide 1. The receiving end face 210 may extend outwardly in the conduit radial direction from the opening end of the receiving conduit line 20, and may be continuous in the conduit circumferential direction. The receiving inner circumferential surface 211 may be disposed outward of the flange 11 in the conduit radial direction RD.

Thus, since the flange end face 12 of the inserting waveguide 1 and the receiving end face 210 of the receiving waveguide 2 are parallel to each other, both faces (12, 210) can be brought in surface contact with each other. Moreover, since the receiving inner circumferential surface 211 is parallel to the conduit axial direction AD, the inserting waveguide 1 and the receiving waveguide 2 are slidable in parallel to the conduit axial direction AD, and therefore, the flange end face 12 and the receiving end face 210 can be made into a state where they contact with each other and a state where they are separated from each other. An accumulated value of the tolerances of a plurality of machine parts which constitute the transmission path may be a distance D1 between the flange end face 12 and the receiving end face 210. This distance D1 may be 10 mm or less in terms of the radio wave leak control. That is, since the tolerance value of the machine parts become the very large value, such as 10 mm, the degree of freedom in the machine design of the waveguide improves, and an assembling work becomes easier.

Although a great portion of the high frequency which passes through the inserting conduit line 10 illustrated in FIG. 2 passes through the receiving conduit line 20, a part of the high frequency may enter into a gap S1 between the flange end face 12 and the receiving end face 210, and it may go outwardly in the conduit radial direction. However, since the receiving inner circumferential surface 211 covers (surrounds) the flange 11 from outside in the conduit radial direction, it is possible to suppress the leak of the high frequency which goes radially outward. Even if there is a gap between a conduit radial direction outward side surface 13 of the flange 11 and the receiving inner circumferential surface 211, since the component which goes outward in the conduit radial direction RD is dominant in the radio wave passing through the gap S1, the radio wave leakage from the gap between the flange outward side surface 13 and the receiving inner circumferential surface 211 is limited. The gap between the flange outward side surface 13 and the receiving inner circumferential surface 211 may be 0 mm or more and 2.0 mm or less. This is because, if the gap exceeds 2.0 mm, the radio wave leakage will pose a problem and a fall of the waveguide performance due to an axial offset of the waveguides will pose a problem. When one of the outward side surfaces 13 which are located on a part of the edge in the conduit radial direction of the flange 11 contacts the receiving inner circumferential surface 211, the gap between the other outward side surface 13 and the receiving inner circumferential surface 211 may be 2.0 mm or less. When the outward side surfaces 13 located on all of the edge in the conduit radial direction of the flange 11 are separated from the receiving inner circumferential surface 211, the gap between each outward side surface 13 and the receiving inner circumferential surface 211 may be 1.0 mm or less. It is for reducing the axial offset of the waveguides and securing the waveguide performance.

Further, in order to reduce the high frequency at the gap between the flange end face 12 and the receiving end face 210, stub grooves 22 may be provided. As illustrated in FIGS. 1 and 2, the receiving waveguide 2 may have the stub grooves 22 disposed outwardly in the conduit radial direction of the receiving conduit line 20 on both sides. Each stub groove 22 may have a first end 22a which opens to the receiving end face 210, and a second end 22b which closes inside the receiving waveguide 2. In the first embodiment, they may be disposed linearly along the pair of long sides 31 of the rectangular waveguide path 3, respectively. A plurality of stub grooves 22 may be disposed at positions which sandwiches the receiving conduit line 20 in a cross section where the pair of long sides 31 appear. In the first embodiment, although the length of the stub groove 22 along the long side 31 is longer than the long side of the rectangular waveguide path 3, it is not limited to this configuration. As illustrated in FIG. 4, since between the centers 31s of the long sides 31 is the most dominant, the pair of stub grooves 22 may sandwich the centers 31s of the long sides 31 and their vicinity. In detail, the stub grooves 22 may sandwich, at least from outside in the conduit radial direction, an area Ar1 which is 24% of the maximum width W1 of the long side 31, centering on the center 31s of the long side 31. This is because 60% of electric power is distributed over the 24% area Ar1. Further, the stub grooves 22 may sandwich, at least from outside in the conduit radial direction, an area Ar1 which is 36% of the maximum width W1 of the long side 31, centering on the center 31s of the long side 31. This is because 81% of electric power is distributed over the 36% area Ar1.

As illustrated in FIG. 2, an electric length EL1 of the stub groove 22 in the conduit axial direction AD from the first end 22a to the second end 22b may be ½ of a conduit wavelength λg of the stub groove 22. The conduit wavelength λg of the stub groove 22 may be determined according to the long side of the waveguide in the cross section perpendicular to the conduit axial direction of the stub groove 22. Thus, the oscillating electric field in the stub groove 22 may become a node (short-circuit) at each of the first end 22a and the second end 22b, and a part where the oscillating electric field becomes the node (short) may be formed in the gap S1 between the flange end face 12 and the receiving end face 210. As a result, it is possible to suppress the leakage of the electric field which goes outward in the conduit radial direction via the gap S1.

Further, the stub groove 22 may be disposed on the receiving conduit line 20 side of a mid point P1 between the receiving conduit line 20 and the receiving inner circumferential surface 211 in the conduit radial direction RD. It is because the leakage of the electric field can be suppressed more if the part where the oscillating electric field becomes the node (short) in the gap S1 is closer to the receiving conduit line 20. That is, the stub groove 22 is better close to the receiving conduit line 20 as much as possible.

Further, as illustrated in FIG. 2, an electric length EL2 in the conduit radial direction RD from the inner circumferential surface of the inserting conduit line 10 to the receiving inner circumferential surface 211 may be an integer multiple of ½ of a free space wave length λ0. Since it is the integer multiple, the electric length becomes EL2=λ0×½, λ0×2/2, λ0×3/2, . . . , λ0×N/2. N is a natural number of one or larger. The gap S1 of the first embodiment may be formed in a disk shape. Since the cross-sectional area of the gap S1 perpendicular to the conduit axial direction AD is larger than the cross-sectional area of the inserting conduit line 10 perpendicular to the conduit axial direction AD, and it extends in the conduit radial direction, it can be evaluated as the free space. Therefore, the oscillating electric field may become the node (short) at the receiving inner circumferential surface 211 in the gap S1. Further, the oscillating electric field may become the node (short) near the inner circumferential surface of the inserting conduit line 10 in the gap S1 (an extended part of the inner circumferential surface). It is possible to further suppress the leakage of the radio wave via the gap S1. Further, since the oscillating electric field becomes the node (short) near the inner circumferential surface of the conduit line (the inserting conduit line 10, the receiving conduit line 20), it is possible to suppress degradation of the waveguide path characteristics.

Since the flange 11 of the first embodiment has a restriction in which the stress must not be applied, the flange 11 and the receiving waveguide 2 are not fastened with fasteners, such as bolts. Instead, a conduit body which forms the inserting conduit line 10 may be fixed to a base (not illustrated) with fasteners, and the receiving waveguide 2 may be fixed to the base (not illustrated) with fasteners (not illustrated). Therefore, the spatial relationship between the inserting waveguide 1 and the receiving waveguide 2 is fixed, and it becomes in the connected state.

Figure 5:
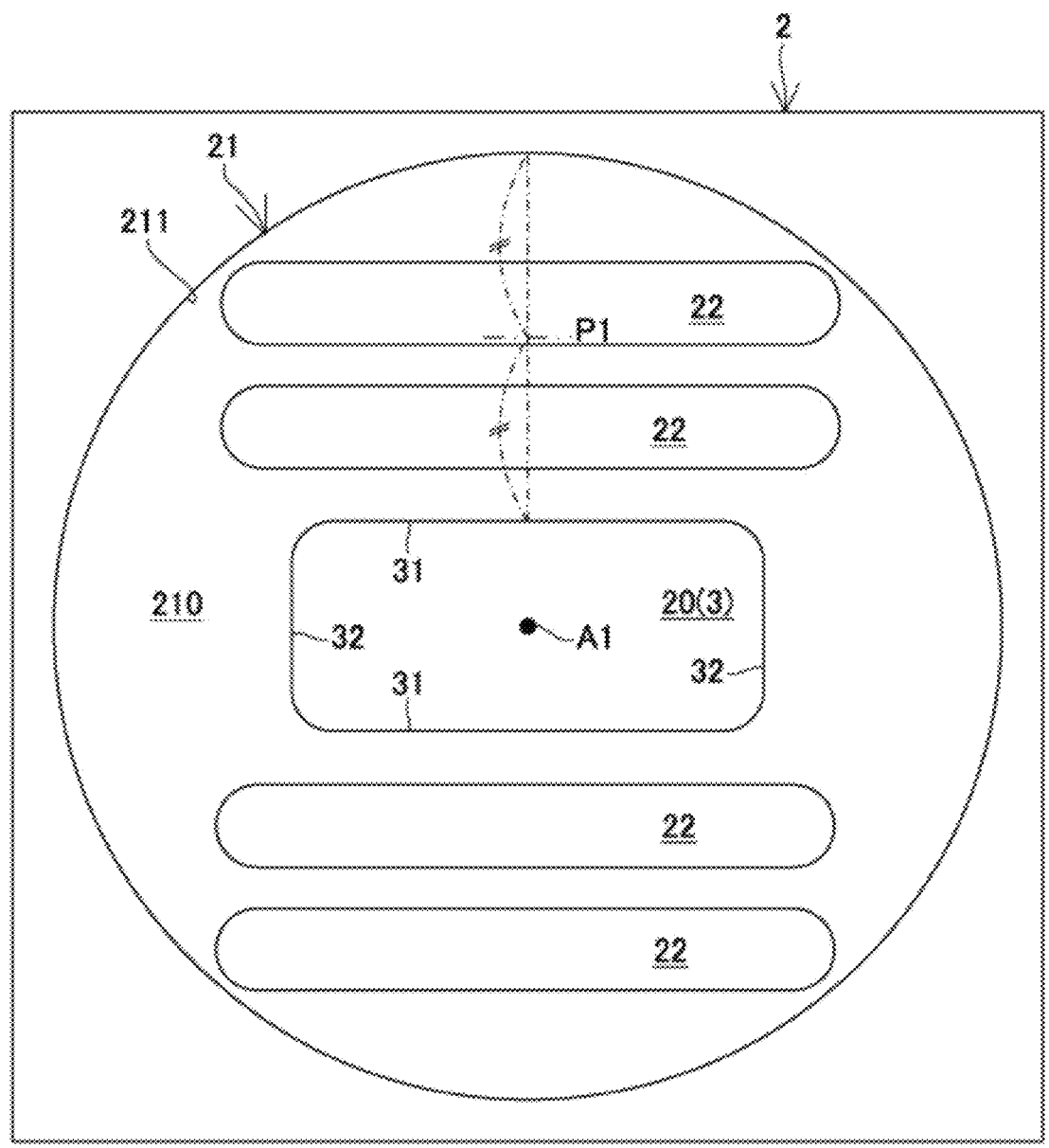
FIG. 5 is a front view illustrating a receiving waveguide of a modification of the first embodiment when seen in the direction parallel to the conduit axis.
Figure 5:
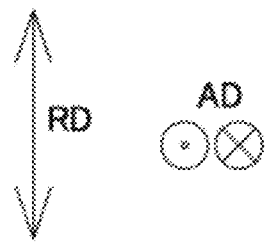

Modifications (1) In the first embodiment illustrated in FIGS. 1 to 4, although one stub groove 22 is disposed at one side of the receiving conduit line 20, it is not limited to this configuration. For example, as illustrated in FIG. 5, a plurality of (two) stub grooves 22 may be disposed at each side of the receiving conduit line 20, outward in the conduit radial direction RD. Two stub grooves 22 may be disposed at each side of the receiving conduit line 20 (the total of four stub grooves). Thus, it becomes possible to improve the suppressing effect of the leakage of the radio wave by the stub grooves.

In this case, at least one stub groove 22 may be disposed on the receiving conduit line 20 side of the mid point P1 between the receiving conduit line 20 and the receiving inner circumferential surface 211 in the conduit radial direction RD.

Figure 6:
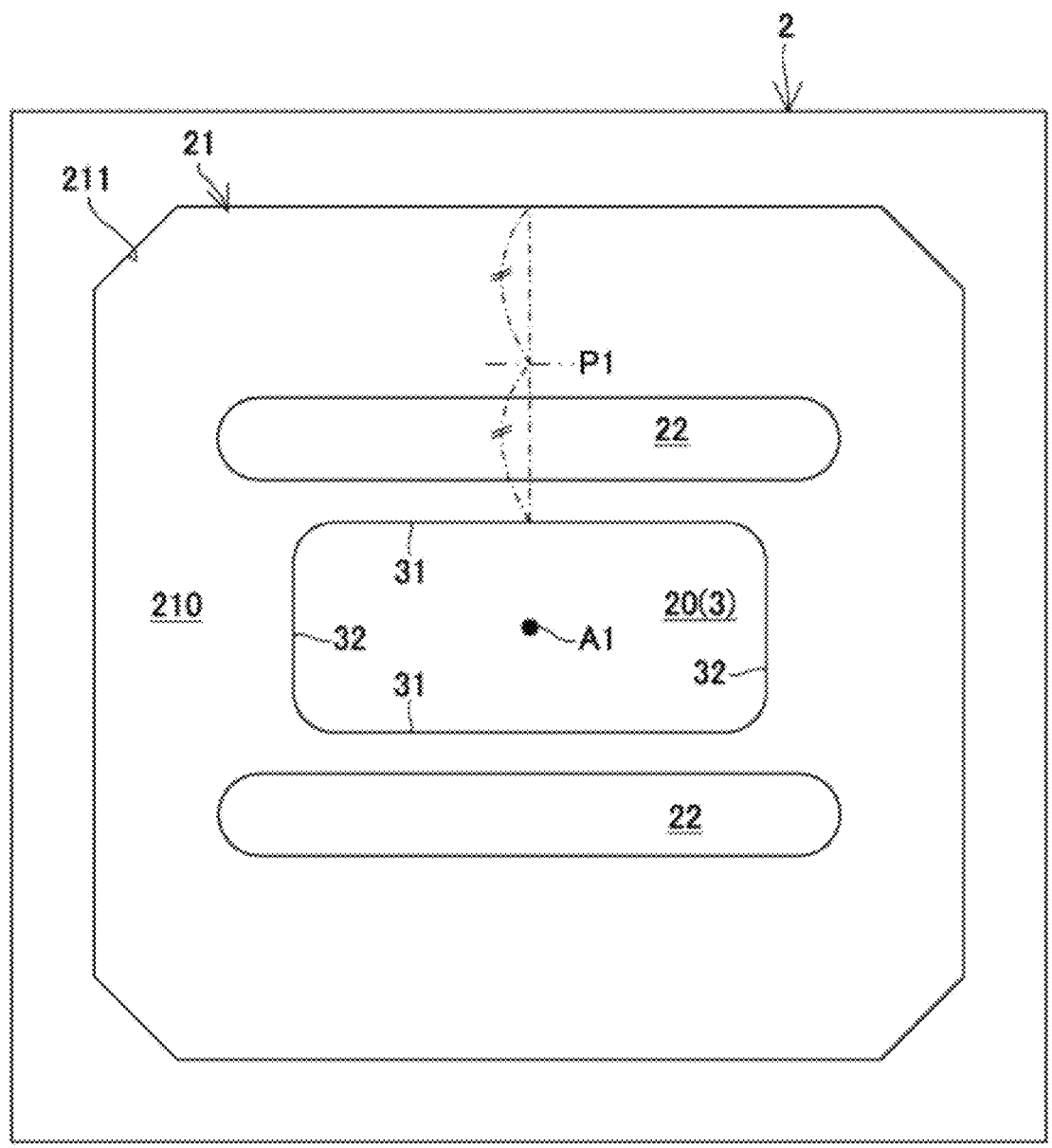
FIG. 6 is a front view illustrating a receiving waveguide of another modification of the first embodiment when seen in the direction parallel to the conduit axis.

(2) In the embodiment illustrated in FIGS. 1 to 5, although the receiving inner circumferential surface 211 is disposed in the circular shape when seen in the direction parallel to the conduit axis A1, it is not limited to this configuration. For example, as illustrated in FIG. 6, the receiving inner circumferential surface 211 may be formed in a polygonal shape when seen in a direction parallel to the conduit axis A1.

(3) In the above embodiment, although the stub groove 22 is disposed on the receiving conduit line 20 side of the mid point P1 between the receiving conduit line 20 and the receiving inner circumferential surface 211 in the conduit radial direction RD, it is not limited to this configuration. The stub groove 22 may be disposed at the mid point P1, or the stub groove 22 may be disposed outwardly in the conduit radial direction RD of the mid point P1. The waveguide performance improves more as the stub groove 22 becomes closer to the receiving conduit line 20. The waveguide performance is deteriorated more as the stub groove 22 separates from the receiving conduit line 20. Anyway, the radio wave leakage reduction effect by the stub groove 22 can be demonstrated.

(4) In the above embodiment, although the electric length EL2 is the integer multiple of ½ of the free space wave length λ0, it is not limited to this configuration. When the radio wave leakage becomes more problem rather than the waveguide performance, the electric length EL2 may not be the integer multiple of ½ of the free space wave length λ0.

Second Embodiment

Figure 7:
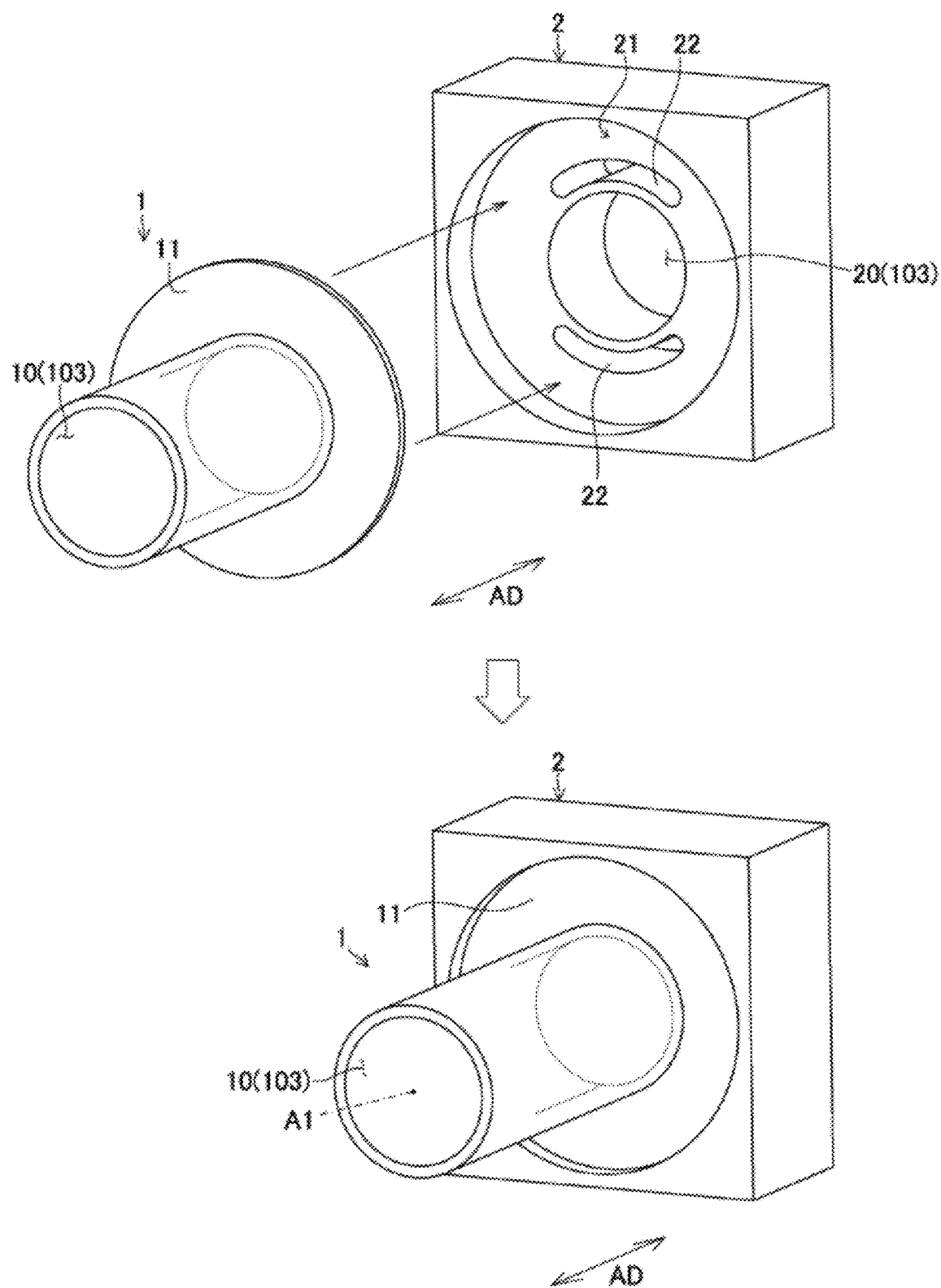
FIG. 7 is a perspective view illustrating a waveguide connecting structure before and after connection according to a second embodiment.
Figure 8:
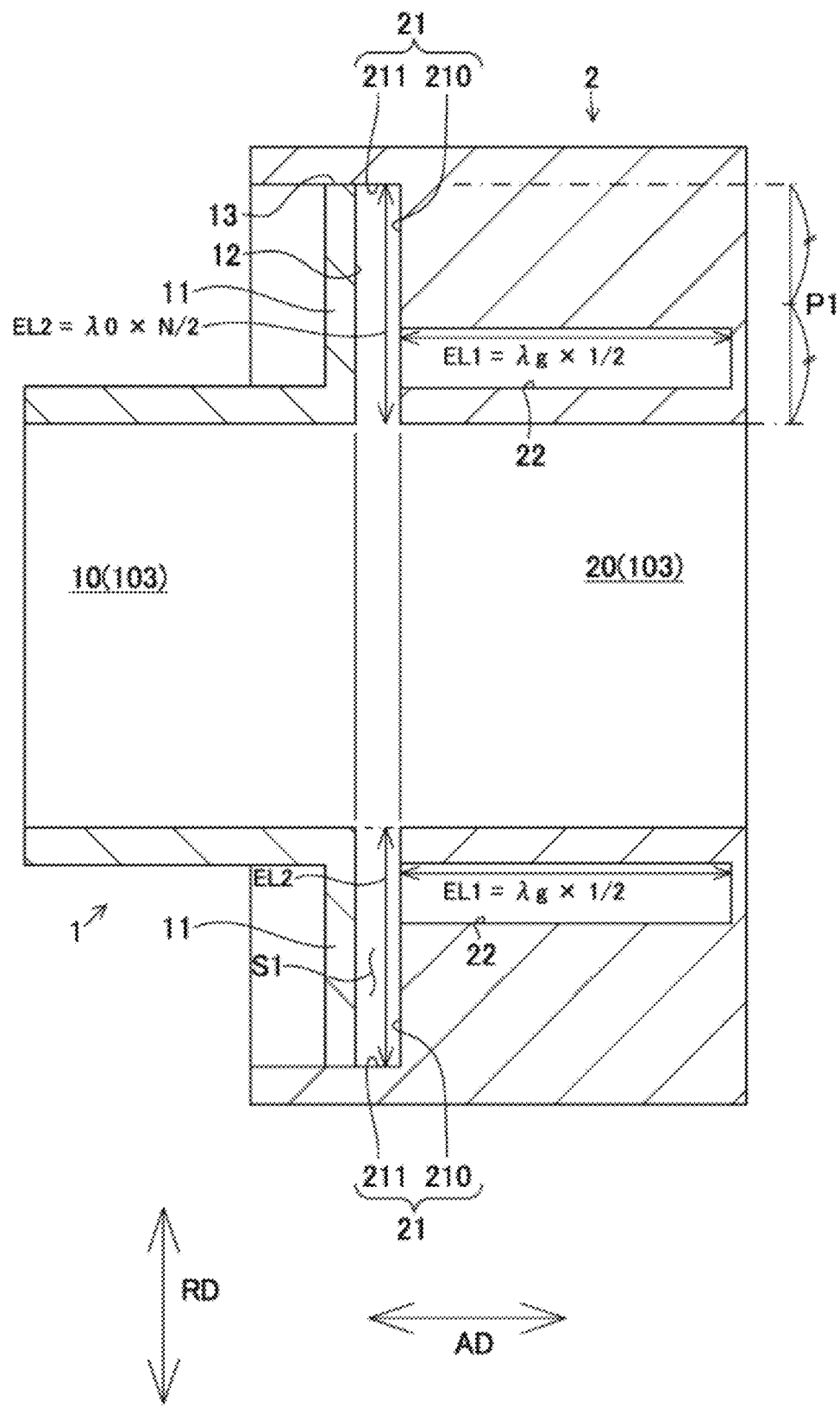
FIG. 8 is a cross-sectional view illustrating a part taken along a line VIII-VIII in FIG. 9.
Figure 9:
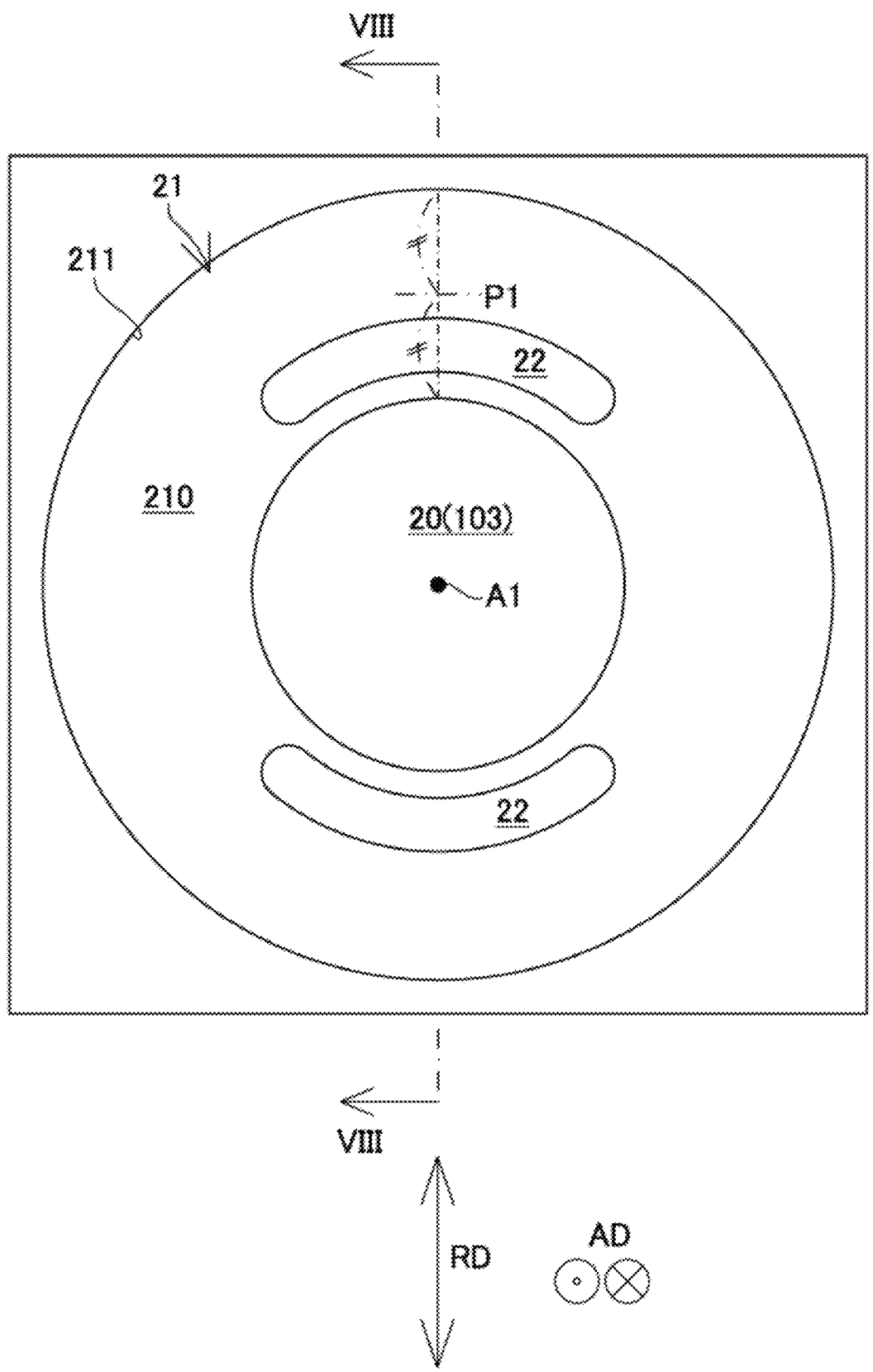
FIG. 9 is a front view illustrating a receiving waveguide of the second embodiment when seen in a direction parallel to the conduit axis.

In the first embodiment and its modification illustrated in FIGS. 1 to 6, although the conduit line is the rectangular waveguide path 3 where the conduit cross section has the long sides 31 and the short sides 32, it is not limited to this configuration. For example, as illustrated in FIGS. 7 to 9, it may be a circular waveguide path 103 where the conduit cross section is circular. As illustrated in FIG. 9, the stub grooves 22 are formed at line-symmetry positions with respect to the conduit axis A1 of the receiving conduit line 20 as a symmetry axis. In the cross section (FIG. 8) passing through the conduit axis A1, a pair of stub grooves 22 are disposed at the positions sandwiching the receiving conduit line 20. In the example illustrated in FIG. 9, each stub groove 22 is curved in an arc shape along an circular inner circumferential surface of the receiving conduit line 20 when seen in a direction parallel to the conduit axis A1, but it is not limited to this configuration. The stub groove 22 may be formed linearly when seen in the direction parallel to the conduit axis A1 as illustrated in FIG. 3.

As described above, like the embodiments illustrated in FIGS. 1 to 9, the waveguide connecting structure may include the inserting waveguide 1 having the inserting conduit line 10 which transmits high frequency, and the flange 11 extending outwardly in the conduit radial direction RD from the opening end of the inserting conduit line 10, and the receiving waveguide 2 having the receiving conduit line 20 abutted to the inserting conduit line 10, the receiving structure 21 into which the inserting waveguide 1 can be inserted, and the stub grooves 22 disposed on both sides of the receiving conduit line 20 outwardly in the conduit radial direction RD. The receiving structure 21 may have the receiving end face 210 which extends in the conduit radial direction RD and opposes to the end face 12 of the flange 11, and the annular receiving inner circumferential surface 211 which extends in the conduit axial direction AD from the receiving end face 210 toward the inserting waveguide 1, and is disposed outwardly in the conduit radial direction RD of the flange 11. The stub groove 22 may have the first end 22a which opens to the receiving end face 210, and the second end 22b which closes inside the receiving waveguide 2. The electric length EL1 of the stub groove 22 from the first end 22a to the second end 22b in the conduit axial direction AD may be ½ of the conduit wavelength λg of the stub groove 22.

Thus, since the inserting waveguide 1 can be inserted into the receiving structure 21 having the receiving end face 210 and the receiving inner circumferential surface 211, both of the state where the receiving end face 210 and the flange 11 contact each other and the state where they are separated from each other are allowed. Therefore, since the separating state is permitted, the tolerances of the machine parts which constitute the waveguides 1 and 2 can be absorbed.

Further, since it is the structure in which the receiving inner circumferential surface 211 of the receiving waveguide 2 surrounds the flange 11 of the inserting waveguide 1 from outside in the conduit radial direction RD, even if the tolerances which separate the receiving end face 210 and the flange end face 12 arises, it is possible to suppress the leakage of the radio wave which goes outward in the conduit radial direction RD via the gap S1.

Further, by setting the electric length EL1 of the stub groove 22 to ½ of the conduit wavelength λg of the stub groove 22, the oscillating electric field E which is produced inside the stub groove 22 may become the node (short) in the receiving end face 210. By forming the part in the gap S1 between the receiving end face 210 and the flange end face 12 where the oscillating electric field E becomes the node (short), it is possible to suppress the leakage of the radio wave which goes outward in the conduit radial direction RD via the gap S1.

Although not being limited in particular, like the embodiments illustrated in FIGS. 1 to 9, the stub groove 22 may be disposed on the receiving conduit line 20 side of the mid point P1 of the receiving conduit line 20 and the receiving inner circumferential surface 211 in the conduit radial direction RD.

Thus, since the part where the oscillating electric field E becomes the node (short) is formed in the part near the receiving conduit line 20 in the gap S1 between the receiving end face 210 and the flange end face 12, it is possible to suppress the leakage of the radio wave which goes outward in the conduit radial direction RD.

Although not being limited in particular, like the embodiments illustrated in FIGS. 1 to 9, the electric length EL2 in the conduit radial direction RD from the inner circumferential surface of the inserting conduit line 10 to the receiving inner circumferential surface 211 may be the integer multiple of ½ of the free space wave length λ0.

According to this configuration, since the node (short) of the oscillating electric field E which may be created in the gap S1 between the receiving end face 210 and the flange end face 12 can occur near the inner circumferential surface of the inserting conduit line 10, it becomes possible to further suppress the leakage of the radio wave via the gap S1. Further, since near the inner circumferential surfaces of the inserting conduit line 10 and the receiving conduit line 20 becomes the node (short) of the oscillating electric field E, it is possible to suppress the degradation of the waveguide path characteristics.

Although not being limited in particular, like the embodiment illustrated in FIG. 5, a plurality of stub grooves 22 may be disposed on each side of the receiving conduit line 20 outwardly in the conduit radial direction RD.

According to this configuration, it becomes possible to improve the suppressing effect of the radio wave leakage by the stub groove 22.

Although not being limited in particular, the embodiment illustrated in FIGS. 1 to 6, the receiving conduit line 20 may be the rectangular waveguide path 3 having the conduit cross section with the long sides 31 and the short sides 32, and the stub groove 22 may be disposed along each of the pair of long sides 31.

According to this configuration, it becomes possible to appropriately suppress the leakage of the high frequency from the rectangular waveguide path 3.

Although not being limited in particular, like the embodiment illustrated in FIGS. 7 to 9, the receiving conduit line 20 may be the circular waveguide path 103 where the conduit cross section is circular, and the stub grooves 22 may be formed at the line-symmetry positions with respect to the conduit axis A1 of the receiving conduit line 20 as the symmetry axis.

According to this configuration, since the electric field becomes the largest in the arbitrary conduit radial direction RD which passes through the conduit axis A1, the circular waveguide path 103 is possible to appropriately suppress the leakage of the high frequency.

Although the embodiments of the present disclosure are described above based on the drawings, the concrete configuration is not limited to these embodiments. The scope of the present disclosure is illustrated not only by the description of the embodiment but also by the appended claims, and it encompasses the meaning equivalent to the claims, and all the changes within the scope.

It is possible to adopt as the structure adopted in each embodiment described above in other arbitrary embodiments.

The concrete configuration of each part is not limited only to the embodiments described above, and it may be variously changed without departing from the spirit of the present disclosure.

Other Waveguide Connecting Structures

Figure 10:
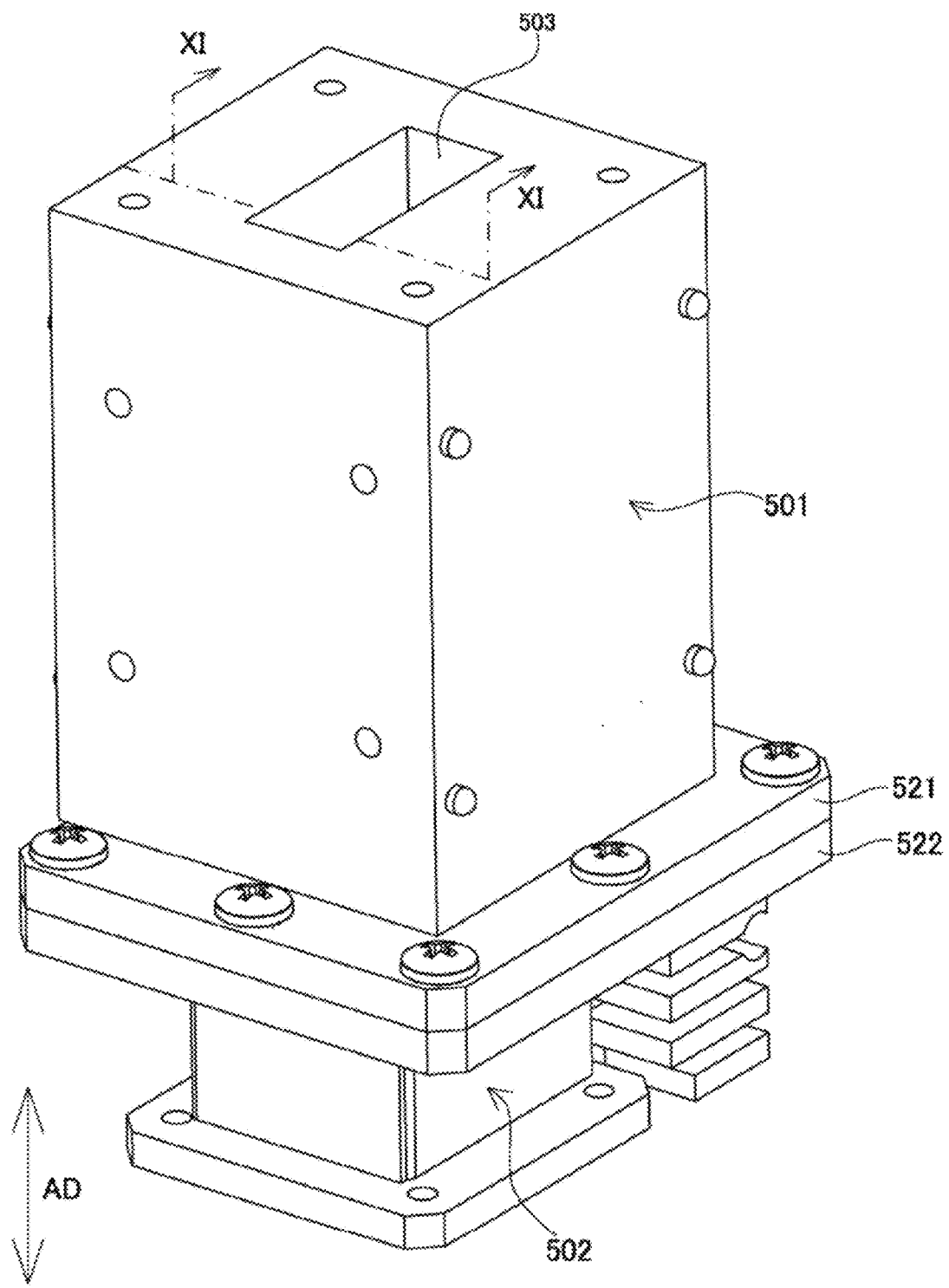
FIG. 10 is a perspective view illustrating a waveguide connecting structure other than the above.
Figure 11:
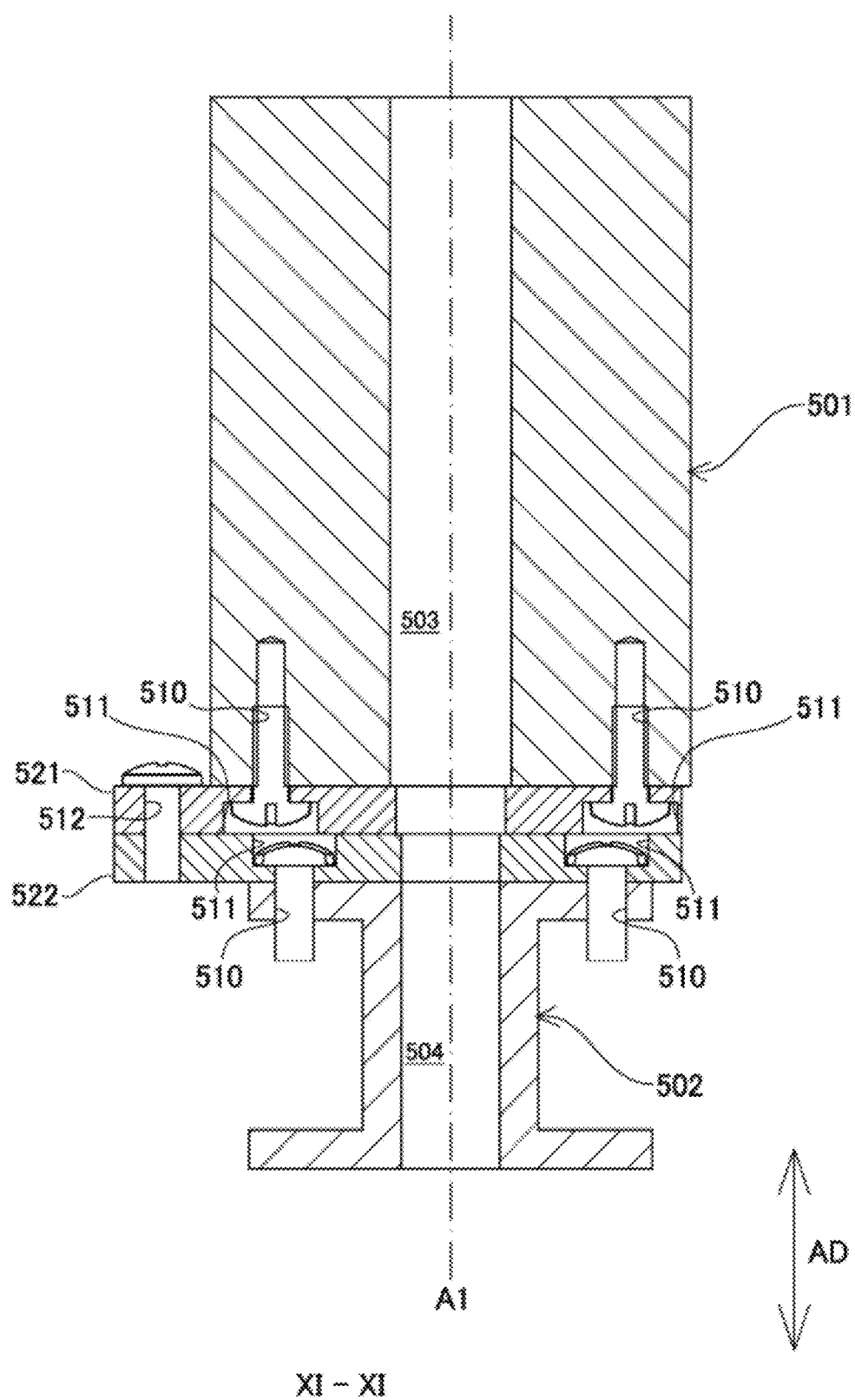
FIG. 11 is a cross-sectional view illustrating a part taken along a line XI-XI in FIG. 10.

FIGS. 10 and 11 illustrate a waveguide connecting structure other than the above. This waveguide connecting structure is a connecting structure of a conduit line 503 of a first waveguide 501 and a conduit line 504 of a second waveguide 502. In both the first waveguide 501 and the second waveguide 502, screw holes 510 for connection may be formed in end faces in the conduit axial direction AD. The female-type waveguides 501 and 502 having the screw holes 510 in the end faces cannot be connected as they are.

Therefore, a first spacer 521 may be attached to the axial end face of the first waveguide 501. The first spacer 521 may be fastened to the screw holes 510 of the first waveguide 501 with headed bolts. In the first spacer 521, a spot facing 511 (recess) which accommodates the head of each headed bolt may be formed. The spot facing 511 may be set to have a depth which can completely accommodate the bolt head.

Further, a second spacer 522 may be attached to the end face of the second waveguide 502 in the conduit axial direction AD. The second spacer 522 may be fastened to the screw holes 510 of the second waveguide 502 with headed bolts. In the second spacer 522, a spot facing 511 (recess) which accommodates the head of each headed bolt may be formed. The spot facing 511 may be set to have a depth which can completely accommodate the bolt head.

The first spacer 521 and the second spacer 522 may have protrusions 521a and 522a which project outwardly in the conduit radial direction RD from the first waveguide 501 and the second waveguide 502, respectively. In each of the protrusions 521a and 522a, bolt holes 512 for fastening the first spacer 521 and the second spacer 522 may be formed. The bolt hole 512 may be a clearance hole or a threaded hole. The first spacer 521 and the second spacer 522 may be fastened together by fasteners, such as bolts.

Therefore, the female-type waveguides 501 and 502 may be also connectable. As illustrated in FIG. 11, when the sizes of the conduit lines of the first waveguide 501 and the second waveguide 502 differ, a high-frequency circuit converter may be provided to at least one of the first waveguide 501 and the second spacer 522. The high-frequency converter is a step provided to the inner surface of the conduit line so that a conduit line having the cross-sectional area between the conduit line 503 and the conduit line 504 intervenes. This step has a λ/4 adjustment structure. The electric length of the stepped part in the conduit axial direction is set as a ¼ of the conduit wavelength of the converting source. The length of the long side in the cross section perpendicular to the conduit axial direction is determined to be $\sqrt{(Z1*Z2)}$, where an impedance of the converting source is Z1 and an impedance of the converting destination is Z2. The length of the short side in the cross section perpendicular to the conduit axial direction is determined according to an aspect ratio of the converting-source waveguide.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A waveguide connecting structure, comprising:
an inserting waveguide including
   an inserting conduit line configured to transmit a radio frequency wave; and
   a flange extending outwardly in a conduit radial direction from an opening end of the inserting conduit line; and
a receiving waveguide including
   a receiving conduit line abutted to the inserting conduit line;
   a receiving structure into which the inserting waveguide is inserted, wherein the receiving structure includes a receiving end face extending in the conduit radial direction and opposing an end face of the flange, and an annular receiving inner circumferential surface extending in a conduit axial direction from the receiving end face toward the inserting waveguide and disposed outwardly in the conduit radial direction of the flange; and
   stub grooves disposed outwardly in the conduit radial direction of a first side and a second side of the receiving conduit line, wherein each stub groove has a first end opening to the receiving end face and a second end closing inside the receiving waveguide, and an electric length of each stub groove in the conduit axial direction from the first end to the second end is ½ of a conduit wavelength of the stub groove.

2. The waveguide connecting structure of claim 1, wherein
each stub groove is disposed on the receiving conduit line side of a mid point of the receiving conduit line and the receiving inner circumferential surface in the conduit radial direction.

3. The waveguide connecting structure of claim 1, wherein
an electric length in the conduit radial direction from an inner circumferential surface of the inserting conduit line to the receiving inner circumferential surface is an integer multiple of ½ of a free space wave length.

4. The waveguide connecting structure of claim 2, wherein
an electric length in the conduit radial direction from an inner circumferential surface of the inserting conduit line to the receiving inner circumferential surface is an integer multiple of ½ of a free space wave length.

5. The waveguide connecting structure of claim 1, wherein
a plurality of stub grooves are disposed outwardly in the conduit radial direction on each of the first side and the second side of the receiving conduit line.

6. The waveguide connecting structure of claim 2, wherein
a plurality of stub grooves are disposed outwardly in the conduit radial direction on each of the first side and the second side of the receiving conduit line.

7. The waveguide connecting structure of claim 3, wherein
a plurality of stub grooves are disposed outwardly in the conduit radial direction on each of the first side and the second side of the receiving conduit line.

8. The waveguide connecting structure of claim 4, wherein
a plurality of stub grooves are disposed outwardly in the conduit radial direction on each of the first side and the second side of the receiving conduit line.

9. The waveguide connecting structure of claim 1, wherein
the receiving conduit line is a rectangular waveguide path having a conduit cross section with long sides and short sides, and
each of the stub grooves is disposed along the long sides.

10. The waveguide connecting structure of claim 2, wherein
the receiving conduit line is a rectangular waveguide path having a conduit cross section with long sides and short sides, and
each of the stub grooves is disposed along the long sides.

11. The waveguide connecting structure of claim 3, wherein
the receiving conduit line is a rectangular waveguide path having a conduit cross section with long sides and short sides, and
each of the stub grooves is disposed along the long sides.

12. The waveguide connecting structure of claim 4, wherein
the receiving conduit line is a rectangular waveguide path having a conduit cross section with long sides and short sides, and
each of the stub grooves is disposed along the long sides.

13. The waveguide connecting structure of claim 5, wherein
the receiving conduit line is a rectangular waveguide path having a conduit cross section with long sides and short sides, and
each of the stub grooves is disposed along the long sides.

14. The waveguide connecting structure of claim 6, wherein
the receiving conduit line is a rectangular waveguide path having a conduit cross section with long sides and short sides, and
each of the stub grooves is disposed along the long sides.

15. The waveguide connecting structure of claim 7, wherein
the receiving conduit line is a rectangular waveguide path having a conduit cross section with long sides and short sides, and
each of the stub grooves is disposed along the long sides.

16. The waveguide connecting structure of claim 8, wherein
the receiving conduit line is a rectangular waveguide path having a conduit cross section with long sides and short sides, and
each of the stub grooves is disposed along the long sides.

17. The waveguide connecting structure of claim 1, wherein
the receiving conduit line is a circular waveguide path with a circular conduit cross section, and
the stub grooves are formed at line-symmetry positions with respect to a conduit axis of the receiving conduit line as a symmetry axis.

18. The waveguide connecting structure of claim 2, wherein
the receiving conduit line is a circular waveguide path with a circular conduit cross section, and
the stub grooves are formed at line-symmetry positions with respect to a conduit axis of the receiving conduit line as a symmetry axis.

19. The waveguide connecting structure of claim 3, wherein
the receiving conduit line is a circular waveguide path with a circular conduit cross section, and
the stub grooves are formed at line-symmetry positions with respect to a conduit axis of the receiving conduit line as a symmetry axis.

20. The waveguide connecting structure of claim 4, wherein
the receiving conduit line is a circular waveguide path with a circular conduit cross section, and
the stub grooves are formed at line-symmetry positions with respect to a conduit axis of the receiving conduit line as a symmetry axis.

* * * * *